United States Patent
Hsu

(10) Patent No.: US 9,800,186 B2
(45) Date of Patent: Oct. 24, 2017

(54) MAGNETOELECTRIC DEVICE CAPABLE OF STORING USABLE ELECTRICAL ENERGY

(71) Applicants: Fu-Tzu Hsu, Taipei (TW); Chieh-Sen Tu, New Taipei (TW)

(72) Inventor: Fu-Tzu Hsu, Taipei (TW)

(73) Assignees: Fu-Tzu Hsu, Taipei; Chieh-Sen Tu, New Taipei ( * ) Notice: Subject to any disclaimer, the term of this patent is extended or adjusted under 35 U.S.C. 154(b) by 53 days.

(21) Appl. No.: 15/013,952

(22) Filed: Feb. 2, 2016

(65) Prior Publication Data

US 2016/0233806 A1    Aug. 11, 2016

(30) Foreign Application Priority Data

Feb. 9, 2015   (TW) .............................. 104104256 A

(51) Int. Cl.
| | |
|---|---|
| *H02P 11/00* | (2006.01) |
| *H02M 7/797* | (2006.01) |
| *H02P 23/26* | (2016.01) |
| *H02K 7/02* | (2006.01) |
| *H02K 47/00* | (2006.01) |

(52) U.S. Cl.
CPC ............... *H02P 11/00* (2013.01); *H02K 7/02* (2013.01); *H02K 47/00* (2013.01); *H02M 7/797* (2013.01); *H02P 23/26* (2016.02)

(58) Field of Classification Search
CPC ........ H02M 7/797; H02K 47/00; H02P 23/26; H02P 11/00

USPC ............ 322/91, 24, 28, 59, 68, 77; 290/1 R; 307/10.1
See application file for complete search history.

(56) References Cited

U.S. PATENT DOCUMENTS

| | | | |
|---|---|---|---|
| 2002/0043954 A1* | 4/2002 | Hallidy ................... | H02P 6/085 318/727 |
| 2010/0030412 A1* | 2/2010 | Mitsutani ................ | B60L 3/003 701/22 |
| 2010/0071971 A1* | 3/2010 | Tatematsu ........... | B60L 11/1803 180/65.8 |
| 2011/0241598 A1* | 10/2011 | Yamada .................. | B60L 15/20 318/716 |
| 2011/0248663 A1* | 10/2011 | Yamakawa ............. | B60L 11/08 318/805 |

(Continued)

FOREIGN PATENT DOCUMENTS

| | | | |
|---|---|---|---|
| JP | 2013242110 A | * 12/2013 | |
| WO | WO 2013150392 A2 | * 10/2013 | ............. H02K 53/00 |

OTHER PUBLICATIONS

Machine Translation of JP 2013-242110 A. Sakano, Dec. 2013.*

*Primary Examiner* — Julio C. Gonzalez
(74) *Attorney, Agent, or Firm* — Hamre, Schumann, Mueller & Larson, P.C.

(57) ABSTRACT

A magnetoelectric device capable of storing usable electrical energy includes an inductive servo control unit and a motor. The motor includes a rotor and three ferromagnetic-core coils disposed around the rotor. The inductive servo control unit executes individual phase control on the three-phase induction motor to magnetize the ferromagnetic-core coils with respective phases. When each of the ferromagnetic-core coils is demagnetized, it generates a current due to counter-electromotive force to charge a damping capacitor.

7 Claims, 5 Drawing Sheets

(56) References Cited

U.S. PATENT DOCUMENTS

| | | | |
|---|---|---|---|
| 2012/0049770 A1* | 3/2012 | Bouchez | B60L 11/1814 318/139 |
| 2012/0242268 A1* | 9/2012 | Yashiro | H02P 27/085 318/503 |
| 2012/0256571 A1* | 10/2012 | Ang | B60L 11/1803 318/400.3 |
| 2012/0323430 A1* | 12/2012 | Nakamura | B60L 11/1803 701/22 |
| 2014/0265947 A1* | 9/2014 | Hsu | H02P 25/184 318/139 |
| 2015/0008849 A1* | 1/2015 | Benson | H02P 6/00 318/139 |
| 2015/0084607 A1* | 3/2015 | Hayami | H02M 3/158 323/271 |
| 2015/0280552 A1* | 10/2015 | Hsu | H01F 27/24 323/362 |

* cited by examiner

US 9,800,186 B2

MAGNETOELECTRIC DEVICE CAPABLE OF STORING USABLE ELECTRICAL ENERGY

CROSS-REFERENCE TO RELATED APPLICATION

This application claims priority of Taiwanese Application No. 104101256, filed on Feb. 9, 2015.

FIELD

The disclosure relates to a magnetoelectric device, and snore particularly to a magnetoelectric device capable of storing usable electrical energy.

BACKGROUND

Referring to FIG. 1, a conventional magnetoelectric device includes a three-phase induction motor 1, and a generator 2 connected to the three-phase induction motor 1. The three-phase induction motor 1 is powered by an alternating current source (AC), and is configured to drive the generator 2 with fixed rotation speed and torsion force. For example, when apparent power provided by the alternating current source (AC) to the three-phase induction motor 1 is 1 KVA, the generator 2 may generate electrical energy output having real power of 1 KW. However, since the three-phase induction motor 1 (e.g., coils thereof) has inductive reactance that may generate reactive power, real power of the three-phase induction motor 1 is reduced. Accordingly, the power factor of the conventional magnetoelectric device is low, and electrical energy supplied by the alternating current source (AC) is wasted.

SUMMARY

Therefore, an object of the disclosure is to provide a magnetoelectric device that can alleviate at least one of the drawbacks, of the prior arts.

According to the disclosure, the magnetoelectric device capable of storing usable electrical energy includes an inductive servo control unit and a three-phase induction motor.

The inductive servo control unit includes a damping capacitor and three bridge arms. The damping capacitor is configured to be electrically connected to a direct current (DC) source in parallel. Each of the bridge arms is configured to be electrically connected to the DC source in parallel.

Each of the three bridge arms includes a first switch, a second switch, a first freewheeling diode and a second freewheeling diode. The first switch has a first end configured to foe electrically connected to a positive terminal of the DC source, and a second end. The second switch has a first end electrically connected to the second end of the first switch at a common node, and a second end configured to be electrically connected to a negative terminal of the DC source. The first freewheeling diode is electrically connected to the first switch in parallel, and has a cathode configured to be electrically connected to the positive terminal of the DC source. The second freewheeling diode is electrically connected to the second switch in parallel, and has an anode configured to be electrically connected to the negative terminal of the DC source.

The three-phase induction motor includes a rotor and three ferromagnetic-core coils disposed around the rotor. Each of the ferromagnetic-core coils is electrically connected between a respective corresponding pair of the bridge arms. Each of the ferromagnetic-core coils has one end connected to the common node of the first and second switches of one of the bridge arms of the corresponding pair, and the other end connected to the common nods of the first and second switches of the other one of the bridge arms of the corresponding pair.

For each of the ferromagnetic-core coils, when the first switch of one of the bridge arms of the corresponding pair and the second switch of the other one of the bridge arms of the corresponding pair are both switched on, the ferromagnetic-core coil is electrically connected to the DC source and is magnetized so as to drive the rotor to rotate.

For each of the ferromagnetic-core coils, when the first switch of the one of the bridge arms of the corresponding pair and the second switch of the other one of the bridge arms of the corresponding pair are both switched off, the ferromagnetic-core coil generates a current due to counter-electromotive force flowing through the second freewheeling diode of the one of the bridge arms of the corresponding pair and the first freewheeling diode of the other one of the bridge arms of the corresponding pair to charge the damping capacitor.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
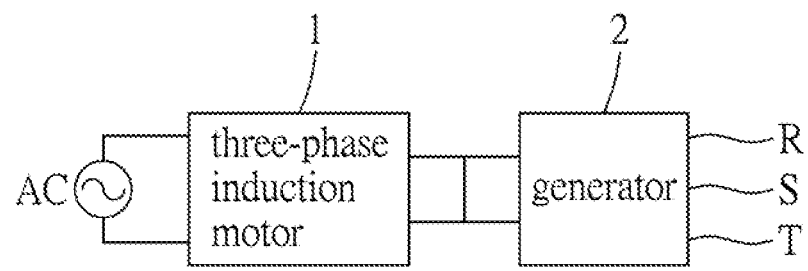
FIG. 1 is a schematic block diagram of a conventional magnetoelectric device.

Before the disclosure is described in greater detail, it should, be noted that like elements are denoted by the same reference numerals throughout the disclosure.

Figure 2:
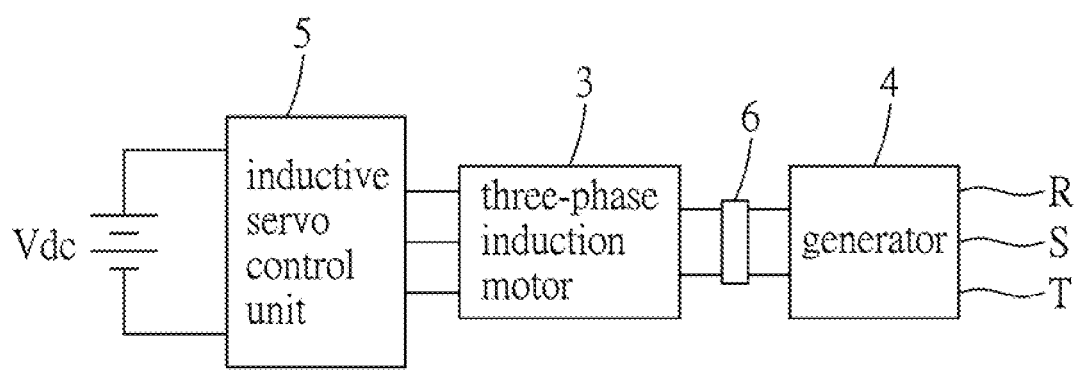
FIG. 2 is a schematic block diagram of a first embodiment of a magnetoelectric device according to the disclosure.

The first embodiment of a magnetoelectric device according to this disclosure is shown in FIG. 2. The magnetoelectric device is capable of storing usable electrical energy, is powered by a direct current (DC) source (Vdc), and generates three-phase electrical energy output. The magnetoelectric device includes an inductive servo control unit 5, a three-phase induction motor 3, a mechanical damping unit 6 and a generator 4. In this embodiment, the DC source (Vdc) is a rechargeable battery.

Figure 5:
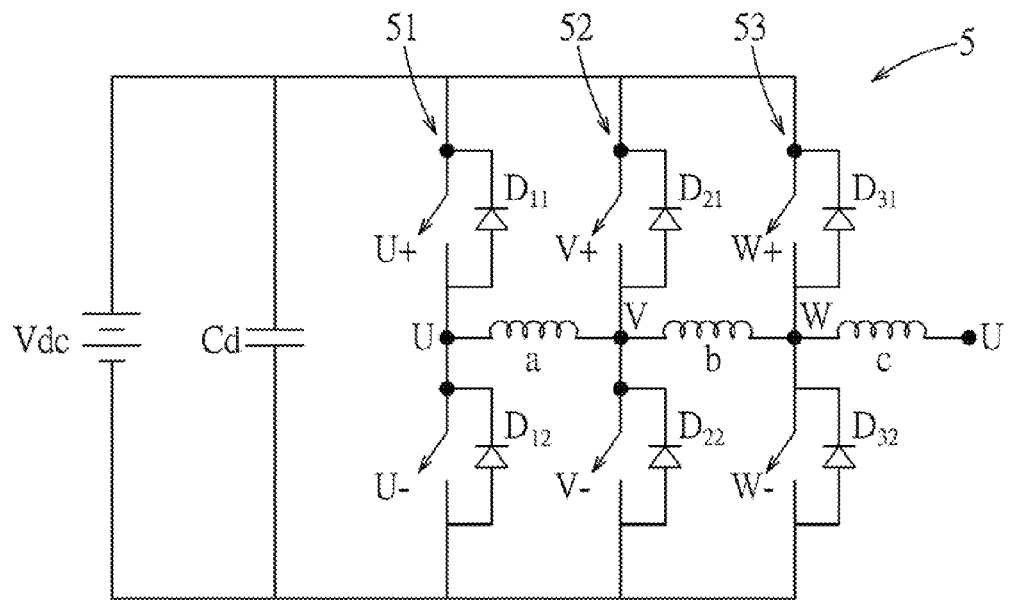
FIG. 5 is a circuit diagram of an inductive servo control unit of the magnetoelectric device according to the disclosure.

The inductive servo control unit 5 is coupled to the three-phase induction motor 3, and is configured to control operation of the three-phase induction motor 3. Referring to FIG. 5, the inductive servo control unit 5 is electrically coupled to the DC source (Vdc), and includes a damping capacitor (Cd) and three bridge arms 51-53. The damping capacitor (Cd) is electrically connected to the DC source (Vdc) in parallel. Each of the bridge arms 51-53 is electrically connected to the DC source (Vdc) in parallel, and includes a first switch (U+, V+, W+), a second switch (U−, V−, W−), a first freewheeling diode ($D_{11}$, $D_{21}$, $D_{31}$), and a second freewheeling diode ($D_{12}$, $D_{22}$, $D_{32}$). In this embodiment, each of the first and second switches (U+, V+, W+, U−, V−, W−) is a power metal oxide semiconductor field-effect transistor (power MOSFET).

In each of the bridge arms 51-53, the first switch U+, V+, W+) has a first end and a second end. The first end of the first switch (U+, V+, W+) is electrically connected to a positive terminal of the DC source (Vdc). The second switch (U−, V−, W−) has a first end and a second end. The first end of the second switch (U−, V−, W−) is electrically connected to the second end of the first switch (U+, V+, W+) at a common node (U, V, W). The second end of the second switch (U−, V−, W−) is electrically connected to a negative terminal of the DC source (Vdc). The first freewheeling diode ($D_{11}$, $D_{21}$, $D_{31}$) is electrically connected to the first switch (U+, V+, W+) in parallel, and has a cathode electrically connected to the positive terminal of the DC source (Vdc), and an anode electrically connected to the common node (U, V, W). The second freewheeling diode ($D_{12}$, $D_{22}$, $D_{32}$) is electrically connected to the second switch (U−, V−, W−) in parallel, and has an anode electrically connected to the negative terminal of the DC source (Vdc), and a cathode electrically connected to the common node (U, V, W).

Figure 3:
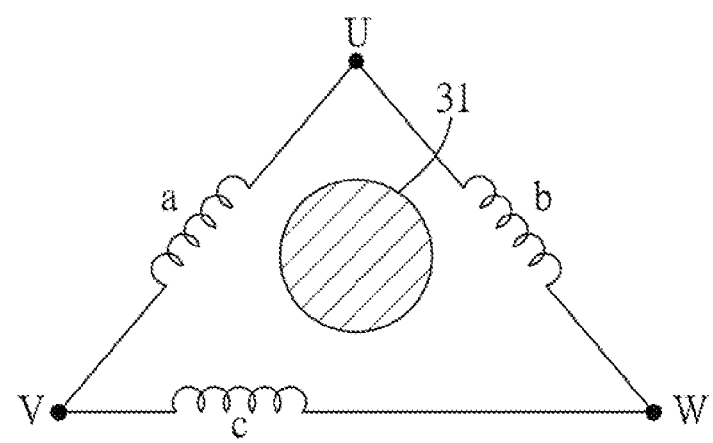
FIG. 3 is a schematic diagram of a three-phase induction motor of the magnetoelectric device for illustrating a rotor and three ferromagnetic-core coils of the three-phase induction motor.

Referring to FIGS. 2 and 3, the three-phase induction motor 3 includes a stator (not shown), a rotor 31, and three ferromagnetic-core coils (a, b, c) wound on the stator. The ferromagnetic-core coils (a, b, c) are disposed around the rotor 31, and are electrically connected to each other in a delta circuit configuration (Δ). In ether embodiments, the ferromagnetic-core coils (a, b, c) can be electrically connected to each other in a Y circuit configuration. Each of the ferromagnetic-core coils (a, b, c) is electrically connected between a respective corresponding pair of the bridge arias 51-53. In particular, the ferromagnetic-core coil (a) is electrically connected between the bridge arm 51 and the bridge arm 52, the ferromagnetic-core coil (b) is electrically connected between the bridge arm 52 and the bridge arm 53, and the ferromagnetic-core coil (c) is electrically connected between the bridge arm 51 and the bridge arm 53 (see FIG. 5).

Each of the ferromagnetic-core coils (a, b, c) has one end connected to the common node (U, V, W) of the first and second switches (U+, V+, W+, U−, V−, W−) of one of the bridge arms 51-53 of the corresponding pair, and the other end connected to the common node (U, V, W) of the first and second switches (U+ and U−, V+ and V−, W+ and W−) of the other one of the bridge arms 51-53 of the corresponding pair.

In this embodiment, the ferromagnetic-core coil (a) has one end connected to the common node (U) of the first and second switches (U+, U−) of the bridge arm 51, and the other end connected to the common node (V) of the first and second switches (V+, V−) of the bridge arm 52 (see FIG. 5). Similarly, one end of the ferromagnetic-core coil (b) is connected to the common node (V) of the first and second switches (V+, V−) of the bridge arm 52, and the other end of the ferromagnetic-core coil (b) is connected to the common node (W) of the first and second switches (W+, W−) of the bridge arm 53. One end of the ferromagnetic-core coil (c) is connected to the common node (W) of the first and second switches (W+, W−) of the bridge arm 53, and the other end of the ferromagnetic-core coil (c) is connected to the common node (U) of the first and second switches (U+, U−) of the bridge arm 51.

The inductive servo control unit 5 is configured to execute individual phase control on the three-phase induction motor 3 to magnetize the ferromagnetic-core coils (a, b, c) of the three-phase induction motor 3 with respective phases. For each of the ferromagnetic-core coils (a, b, c), when the first switch (U+, V+, W+) of one of the bridge arms 51-53 of the corresponding pair and the second switch (U−, V−, W−) of the other one of the bridge arms 51-53 of the corresponding pair are both switched on, the ferromagnetic-core coil (a, b, c) is electrically connected to the DC source (Vdc) and is magnetized so as to drive the rotor 31 to rotate. For each of the ferromagnetic-core coils (a, b, c), when the first switch (U+V+, W+) of one of the bridge arms 51-53 of the corresponding pair and the second switch (U−, V−, W−) of the other one of the bridge arms 51-53 of the corresponding pair are both switched off, the ferromagnetic-core coil (a, b, c) is demagnetized instantly, and generates a current due to counter-electromotive force flowing through the second freewheeling diode ($D_{12}$, $D_{22}$, $D_{32}$) of said one of the bridge arms 51-53 of the corresponding pair and the first freewheeling diode ($D_{11}$, $D_{23}$, $D_{31}$) of the other one of the bridge arms 51-53 of the corresponding pair to charge the damping capacitor (Cd).

Figure 6:
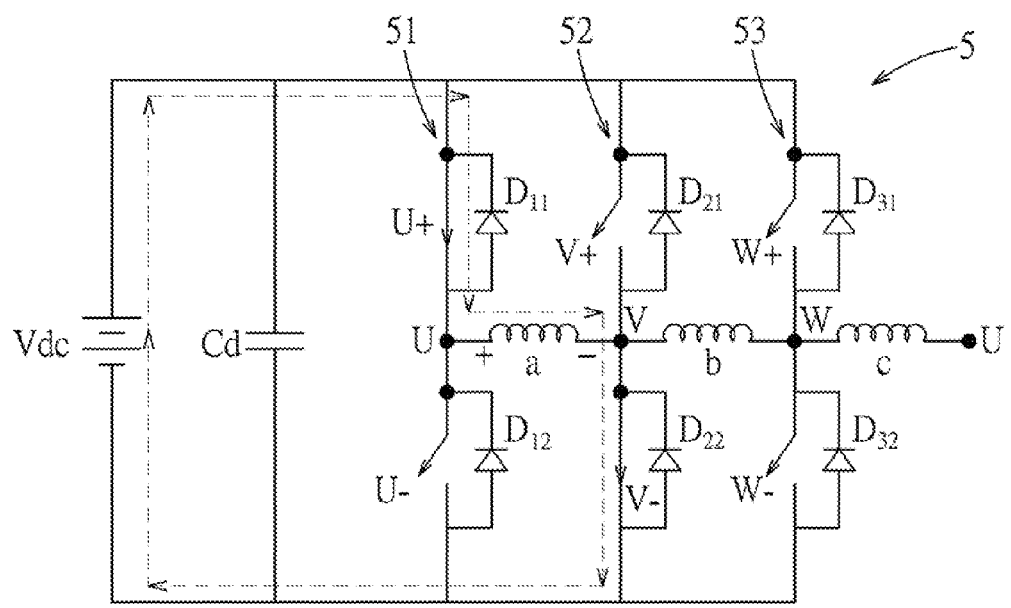
FIG. 6 is a circuit diagram illustrating the inductive servo control unit magnetizing one of the ferromagnetic-core coils of the three-phase induction motor.
Figure 7:
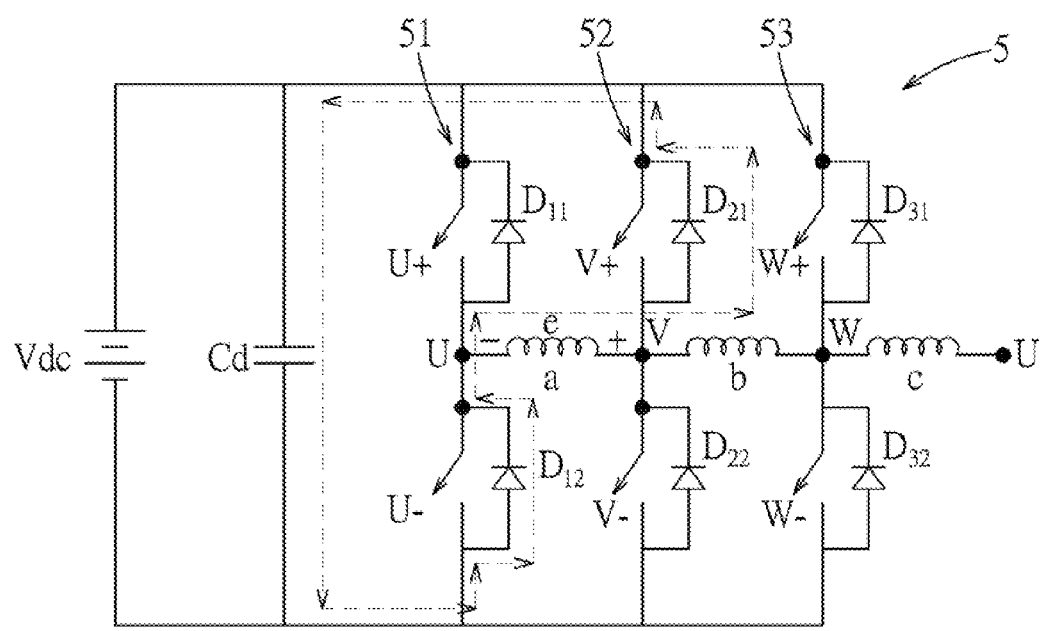
FIG. 7 is a circuit diagram illustrating the inductive servo control unit causing said one of the ferromagnetic-core coils to generate a current due to counter-electromotive force to charge a damping capacitor.

For example, when the first switch (U+) of the bridge arm 51 and the second switch (V−) of the bridge arm 52 are both switched on (see FIG. 6), the ferromagnetic-core coil (a) is electrically connected to the DC source (Vdc) and is magnetized. Then, the first switch (U+) of the bridge arm 51 and the second switch (V−) of the bridge arm 52 are both switched off, such that the ferromagnetic-core coil (a) generates a current due to counter-electromotive force flowing through the second freewheeling diode ($D_{12}$) of the bridge arm 51 and the first freewheeling diode ($D_{21}$) of the bridge arm 52 to charge the damping capacitor (Cd) (see FIG. 7). Subsequently, the first switch (V+) of the bridge arm 52 and the second switch (W−) of the bridge arm 53 are both switched on, and the ferromagnetic-core coil (b) is electrically connected to the DC source (Vdc) and is magnetized. Then, the first switch (V+) of the bridge arm 52 and the second switch (W−) of the bridge arm 53 are both switched off, and the ferromagnetic-core coil (b) generates a current due to counter-electromotive force flowing through the second freewheeling diode ($D_{22}$) of the bridge arm 52 and the first freewheeling diode ($D_{31}$) of the bridge arm 53 to charge the damping capacitor (Cd). Subsequently, the ferromagnetic-core coil (c) is magnetized, and then generates a current for charging the damping capacitor (Cd) in a manner similar to the above description. By continuously repeating the magnetization of the ferromagnetic-core coils (a, b, c), the ferromagnetic-core coils (a, b, c) cooperate together to continuously generate a three-phase alternating magnetic field (i.e., rotating magnetic field), such that the rotor 31 is rotated synchronously with the rotating magnetic field. Further, energy of the counter-electromotive force (i.e., usable electrical energy) is stored and will not be wasted. Further, by virtue of the damping capacitor (Cd), damage to the DC source (Vdc) caused by an instant excessive current can be avoided.

Further, since the ferromagnetic-core coils (a, b, c) continuously generate the currents to charge the damping capacitor (Cd) during the operation of the ferromagnetic-core coils (a, b, c), the damping capacitor (Cd) is always in a full charged state. Therefore, when voltage of the DC source (Vdc) is lower than voltage of the damping capacitor (Cd), the damping capacitor (Cd) can charge the DC source (Vdc), and a duration in which the DC source (Vdc) is capable of supplying electrical energy is increased. In this embodiment, the damping capacitor (Cd) is a non-polar medium frequency capacitor having a frequency matching a switching frequency of the first switches ($D_{11}$, $D_{21}$, $D_{31}$) and the second switches ($D_{12}$, $D_{22}$, $D_{32}$).

Figure 4:
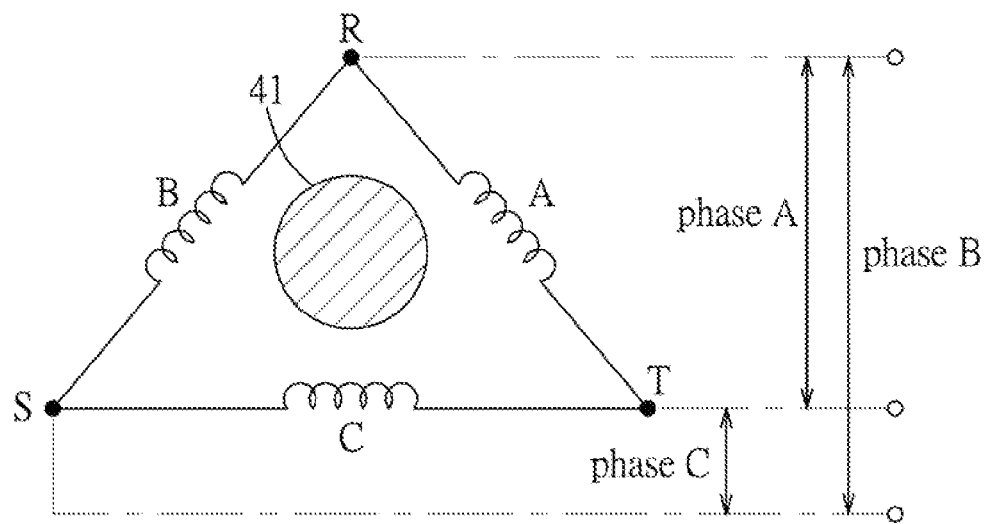
FIG. 4 is a schematic diagram of a generator of the magnetoelectric device for illustrating a rotor and three ferromagnetic-core coils of the generator.

Referring to FIGS. 2 and 4, the generator 4 includes a stator (not shown), three ferromagnetic-core coils (A, B, C) wound on the stator, and a rotor 41. The ferromagnetic-core coils (A, B, C) are disposed around the rotor 41, and are electrically connected to each other in a delta circuit configuration ($\Delta$). In other embodiments, the ferromagnetic-core coils (A, B, C) can be electrically connected to each other in a Y circuit configuration. The rotor 41 of the generator 4 is connected to and is driven by the rotor 31 of the three-phase induction motor 3 to generate the three-phase electrical energy output in the form of a three-phase alternating current having phase A, phase B and phase C. In detail, the rotor 31 of the three-phase induction motor 3 drives the rotor 41 of the generator 4 to rotate, and thus, the ferromagnetic-sore coils (A, B, C) generate induced currents attributed to change of a magnetic field. The induced currents have a phase difference of 120 degrees with each other, and together serve as the three-phase alternating current. When the rotor 31 of the three-phase induction motor 3 drives the rotor 41 of the generator 4 to continuously rotate in a fixed rotation speed of 50/60 Hz, the three-phase alternating current consisting of the induced currents generated by the ferromagnetic-core coils (A, B, C) can be used in place of the mains electricity. The generator 4 is one of a reluctance generator, an alternator and a dynamo.

Further, the mechanical damping unit 6 is connected between the rotor 31 of the three-phase induction motor 3 and the rotor 41 of the generator 4. In this embodiment, the mechanical damping unit 6 is a flywheel used to eliminate counter force that is generated during acceleration and deceleration of the three-phase induction motor 3. By virtue of the mechanical damping unit 6, the stability of the magnetoelectric device is enhanced, and the power consumption of the three-phase induction motor 3 for driving the generator 4 is decreased.

Since the current and voltage outputted by the DC source (Vdc) have the same phase, the DC source (Vdc) only provides real power (active power) to the inductive servo control unit 5. Further since the magnetoelectric device of this embodiment is provided with the mechanical damping unit 6 connected between the three-phase induction motor 3 and the generator 4, and is configured to use the DC source (Vdc), instead of an alternating current source, as a power supply, and the DC source (Vdc) is a rechargeable battery acting as a capacitor, a power ratio of a real power outputted by the DC source (Vdc) to an apparent power outputted to the generator 4 is very low. For example, when the DC source (Vdc) outputs a real power of 100 W to the inductive servo control unit 5, the three-phase induction motor 3 and the mechanical damping unit 6 cooperate to generate a reactive power of 900 W, and thus, the overall apparent power outputted to the generator 4 is 1 KVA (i.e., the power ratio is 0.1). In other words, the real power outputted by the DC source (Vdc) is relatively low, and the inductive servo control unit 5 outputs the apparent power of 1 KVA to the three-phase induction motor 3 by controlling the switching frequency of the first switches ($D_{11}$, $D_{21}$, $D_{31}$) and the second switches ($D_{12}$, $D_{22}$, $D_{32}$) and pulse width modulation. Then, the three-phase induction motor 3 can generate a large reactive power of 900 W attributed to the variation of the rotating magnetic field. Namely, electrical energy supplied by the DC source (Vdc) is completely used by the three-phase induction motor 3, and is not wasted.

Figure 8:
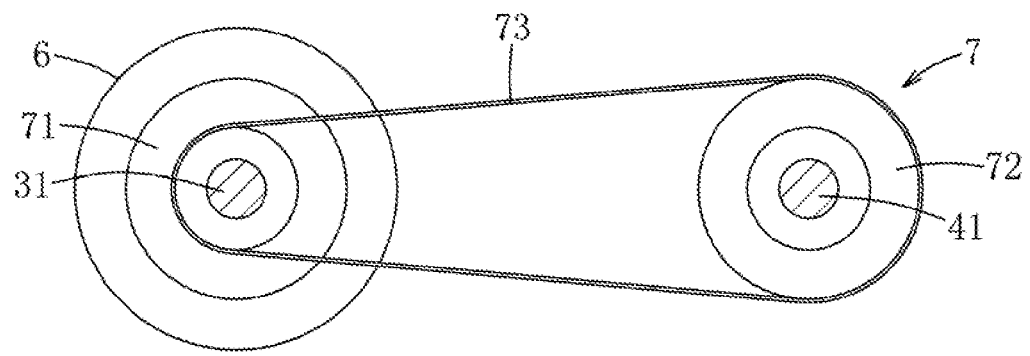
FIGS. 8 and 9 are schematic diagrams illustrating a continuously variable transmission connected between the three-phase induction motor and the generator of the magnetoelectric device according to a second embodiment of the disclosure.
Figure 9:
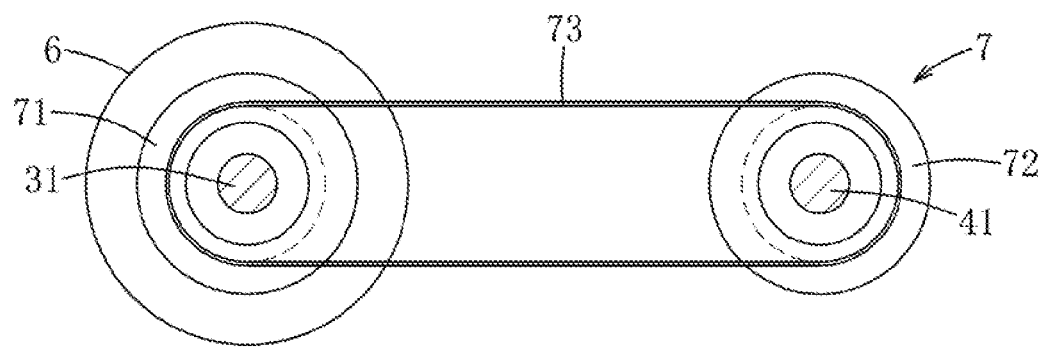

Referring to FIGS. 8 and 9, the second embodiment of a magnetoelectric device according to this disclosure further includes a continuously variable transmission 7. In this embodiment, the mechanical damping unit 6 is connected to the rotor 31 of the three-phase induction motor 3 (see FIG. 2), and the continuously variable transmission 7 is connected between the rotor 31 of the three-phase induction motor 3 and the rotor 41 of the generator 4 (see FIG. 2). The continuously variable transmission 7 includes a drive pulley 71 coaxially connected to the rotor 31 of the three-phase induction motor 3, a driven pulley 72 coaxially connected to the rotor 41 of the generator 4, and a transmission belt 73. The transmission belt 73 is trained, on the drive pulley 71 and the driven pulley 72 for transmitting mechanical energy from the three-phase induction motor 3 to the generator 4. The transmission belt 73 is configured for increasing a gear ratio of the drive pulley 71 to the driven pulley 72 along with increase of rotation speed of the rotor 41 of the generator 4 so as to keep the rotation speed of each of the generator 4 and the three-phase induction motor 3 at a fixed rate of, for example, 1800 rpm. For instance, when the three-phase induction motor 3 is just activated, the transmission belt 73 runs on the driven pulley 72 with a greater radius (see FIG. 8), providing a torque sufficient to activate the generator 4. When the rotation speed of the rotor 41 of the generator 4 picks up, the transmission belt 73 runs on the driven pulley 72 with a smaller radius (see FIG. 9) so as to keep the rotation speed of each of the generator 4 and the three-phase induction motor 3 at the fixed rate. By virtue of the continuously variable transmission 7, power consumption of the three-phase induction motor 3 is relatively low, and the generator 4 may generate the three-phase electrical energy output with relatively great efficiency.

In sum, the inductive servo control unit 5 stores the energy of the counter-electromotive force from the ferromagnetic-core coils (a, b, c) in the damping capacitor (Cd), which can charge the DC source (Vdc), such that the duration in which the DC source (Vdc) is capable of supplying electrical energy is increased. Further, the inductive servo control unit 5 receives the real power from the DC source (Vdc), and outputs the apparent power to the three-phase induction motor 3, such that the three-phase induction motor 3 can generate a large amount of active power attributed to the variation of the rotating magnetic field.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A magnetoelectric device capable of storing usable electrical energy, said magnetoelectric device comprising:

an inductive servo control unit including a damping capacitor configured to be electrically connected to a direct current (DC) source in parallel, and three bridge arms, each of said bridge arms being configured to be electrically connected to the DC source in parallel and including
- a first switch having a first end configured to be electrically connected to a positive terminal of the DC source, and a second end,
- a second switch having a first end electrically connected to said second end of said first switch at a common node, and a second end configured to be electrically connected to a negative terminal of the DC source,
- a first freewheeling diode electrically connected to said first switch in parallel, and having a cathode configured to be electrically connected to the positive terminal of the DC source, and
- a second freewheeling diode electrically connected to said second switch in parallel, and having an anode configured to be electrically connected to the negative terminal of the DC source;

a motor including a rotor and three ferromagnetic-core coils disposed around said rotor, each of said ferromagnetic-core coils being electrically connected between a respective corresponding pair of said bridge arms, and having one end connected to the common node of said first and second switches of one said bridge arms of said corresponding pair, and the other end connected to the common node of said first and second switches of the other of said bridge arms of said corresponding pair; and a generator configured to be driven by said rotor of said motor to generate an electrical energy output, the generator including a rotor connected to and driven by said rotor of said motor;

wherein, for each of said ferromagnetic-core coils, when said first switch of one of said bridge arms of said corresponding pair and said second switch of the other one of said bridge arms of the corresponding pair are both switched on, said ferromagnetic-core coil is electrically connected to the DC source and is magnetized so as to drive said rotor to rotate;

wherein, for each of said ferromagnetic-core coils, when said first switch of said one of said bridge arms of the corresponding pair and said second switch of the other one of said bridge arms of the corresponding pair are both switched off, said ferromagnetic-core coil generates a current due to counter-electromotive force flowing through said second freewheeling diode of said one of said bridge arms of the corresponding pair and said first freewheeling diode of the other one of said bridge arms of the corresponding pair to charge said damping capacitor;

wherein said magnetoelectric device further comprises a continuously variable transmission including
- a drive pulley coaxially connected to said rotor of said motor,
- a driven pulley coaxially connected to said rotor of said generator, and
- a transmission belt trained on said drive pulley and said driven pulley for transmitting mechanical energy from said motor to said generator, and for increasing a gear ratio of said drive pulley to said driven pulley along with increase of rotation speed of said rotor of said generator so as to keep the rotation speed of each of said generator and said motor at a fixed rate.

2. The magnetoelectric device as claimed in claim 1, the DC source being a rechargeable battery,
wherein said damping capacitor is configured to charge the DC source when voltage of the DC source is lower than voltage of said damping capacitor.

3. The magnetoelectric device as claimed in claim 1, wherein said damping capacitor is a non-polar medium frequency capacitor having a frequency matching a switching frequency of said first and second switches of said inductive servo control unit.

4. The magnetoelectric device as claimed in claim 1, wherein said generator is one of a reluctance generator, an alternator and a dynamo.

5. The magnetoelectric device as claimed in claim 1, further comprising a mechanical damping unit connected between said rotor of said motor and said rotor of said generator.

6. The magnetoelectric device as claimed in claim 5, wherein said mechanical damping unit is a flywheel.

7. The magnetoelectric device as claimed in claim 1, wherein said motor is a three-phase induction motor.

* * * * *